Patented Sept. 26, 1939

2,174,131

UNITED STATES PATENT OFFICE 2,174,131

SULPHATED ALKOXY CYCLOHEXANOLS AND PROCESS OF PRODUCING THEM

Herbert A. Lubs, Wilmington, Del., assignor to E. I. du Pont de Nemours & Company, Wilmington, Del., a corporation of Delaware No Drawing. Application December 10, 1937, Serial No. 179,198

10 Claims.  (Cl. 260—457)

This invention relates to sulphated organic compounds having surface active properties. It comprises the particular sulphuric acid esters described herein, their manufacture and use. More particularly, it relates to sulphation products of the mono-alkyl ethers of cyclohexanediol, their preparation and application as wetting, dispersing, deterging, and emulsifying agents, as dye bath aids, and in general as textile assistants.

Of late, there have been numerous attempts to provide new surface active compounds with cleaning, wetting and dispersing properties that may be used more advantageously than ordinary soaps in various industries, for example, the textile, leather and lubricant industries. Ordinary soaps as is well known, have the disadvantage that they are insoluble in acid and strongly alkaline solutions and are precipitated by the alkaline earth salts of hard waters. While sulphated surface active substances have been prepared as substitutes for soaps they have generally been less effective detergents in some respects than the soaps that they were intended to replace. Among the known sulphated compounds for this purpose are various sulphated ethers of aliphatic alcohols with aliphatic glycols. Alkoxy cyclohexyl sulphates are distinct from these and possess desirable properties which differ widely from those of the sulphated products obtained from aliphatic chain dialcohols.

As indicated by the foregoing statements, an object of this invention is to provide new chemical products which are water soluble and have good wetting and detergent properties under adverse conditions. A further object of the invention is to provide an effective process for producing the above-described products. Further purposes of the invention will be pointed out later or will be evident from the description which follows:

These objects are accomplished according to this invention whereby compounds with good wetting, cleansing and dispersing properties are produced by condensing an aliphatic alcohol with cyclohexene oxide and sulphating the product with a suitable sulphating agent such as chlorsulphonic acid.

While the invention is subject to considerable variation and modification in the manner of its practical application, particularly as regards the kind and proportions of reactants and the exact method of procedure, the following example, in which the parts are by weight, will serve to illustrate a product and process falling within the scope of the invention.

Example

Forty grams of dodecyloxy cyclohexanol were dissolved in 150 cc. of ether. Eighteen and two-tenths grams (110% of theory) of $ClSO_3H$ in 20 grams of ether were added drop-wise over a period of 15 minutes. The sulphation mass was stirred 30 minutes then drowned in ice and caustic soda solution. The mass was evaporated to dryness, taken up in methyl alcohol and filtered to remove inorganic salt. The methyl alcohol solution was diluted with water, petroleum ether extracted to remove unsulphated material and then evaporated to dryness on the steam bath under reduced pressure. The product was a white waxy solid which gave wetting in 25 seconds at a concentration of 0.54 gram per liter.

The intermediate ethers used in this invention can be prepared by any of the conventional methods of synthesizing ethers. For example a sodium alcoholate can be reacted with cyclohexene chlorohydrin. The mono sodium derivative of cyclohexane diol can be reacted with an alkyl salt of a hydrohalogen or sulphuric acid. Our preferred method of preparation consists in reacting the desired alcohol with cyclohexene oxide in the presence of a catalyst such as sulphuric acid, hydrochloric acid or caustic soda.

For the sulphation of the alkoxy cyclohexanol, a wide range of sulphating agents may be used, but it is preferred to employ chlor-sulfonic acid with ether or other suitable diluent. Concentrated sulphuric acid modified with commonly used inhibitors such as potassium acid sulphate give good results. Among other particular sulphating agents that may be mentioned as satisfactory for our purpose are: sodium chlor-sulphonate, amino sulphuric acid, pyridine sulphuric anhydride, dimethylaniline sulphuric anhydride, pyridine sodium pyrosulphate, acetyl sulphuric acid, lower alkyl sulphates, $SO_3$ dissolved in ether, etc.

The degree of sulphation is dependent chiefly on the nature of the alkoxy cyclohexanol to be sulphated, the choice and amount of sulphating agent used, time of sulphation, agitation, amount of solvent used and temperature. Temperatures of 0–10° C. are employed ordinarily, but with certain inhibitors in the sulphating acid, it is possible to operate at somewhat higher temperatures and shorten the time of sulphation.

While the sodium salt of the sulphated ether is disclosed in the example, it is to be understood that salts of other bases both of inorganic and organic type may be prepared such as those of potassium, lithium, magnesium, ammonium, trimethylamine, triethanolamine, pyridine and glucamine. For certain uses, it is advantageous to use a salt other than the sodium salt. Naturally the free acid can be used when desired.

In the following general formula representative of compounds of the invention:

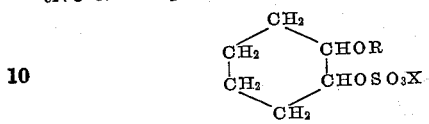

X represents hydrogen or a positive salt-forming radical and R stands for a normal primary alkyl as methyl, ethyl, propyl, etc. up to octadecyl for practical purposes; a branched chain alkyl as 2-ethylhexyl, 2-butyloctyl, the higher boiling branched chain alcohol radicals from the hydrogenated carbon dioxide methanol synthesis; a secondary alkyl as iso propyl, tridecyl-7, pentadecyl-8, 3,9-diethyl-tri-decyl-6; a tertiary radical as diheptyl-ethyl-methyl or the radicals derived from the polymerized butylenes. R may also be a cyclic radical as phenyl ethyl, naphthenyl, cyclohexyl or alkylated cyclohexyl, abietyl or hydroabietyl.

Some of the particularly desirable compounds of the invention are:

1-methoxy cyclohexyl-2-sodium sulphate
1-lauroxy cyclohexyl-2-sodium sulphate
1-(2-ethyl hexoxy) cyclohexyl-2-sodium sulphate
1-abeitoxy cyclohexyl-2-sodium sulphate
1-pentadecoxy cyclohexyl-2-sodium sulphate
1-decoxy cyclohexyl-2-sodium sulphate
1-myristoxy cyclohexyl-2-sodium sulphate Also, sulphates of the mono ether of cyclohexanediol and the higher boiling by-product alcohols from the catalytic synthesis of methanol with hydrogen and carbon dioxide are included. There are many other possible combinations. The choice of a particular compound will depend upon the type of surface active agent required. It is an advantage of this invention that the molecular size and configuration can be varied so as to meet the particular requirement in a surface active agent. For example a long chain alkoxy cyclohexyl sulphate would be particularly useful as a detergent while a much shorter chain alkoxy cyclohexyl sulphate would be useful as a mercerizing assistant.

The sulphates can be used in solution, or can be isolated as the dry salts, which are stable.

The compounds of this invention in general exhibit high water solubility and great surface activity. A list of many particular uses for which they are suitable is given below:

A. Treatment for the processing and improvement of natural or synthetic textile materials involving:

1. Cleansing vegetable and animal fibers when removing fatty or oil materials.
2. Carbonization.
3. As an addition to flax retting baths.
4. Fulling.
5. Sizing.
6. As an addition when sizing is removed from textile materials.
7. Impregnating.
8. Bleaching.
9. Mordanting.
10. As an addition to soap in an acid or hard water bath.
11. Mercerizing lye liquors.
12. Improvement of absorption capability of fibrous materials particularly when subjected to a treatment for finishing, softening, stiffening, coloring or special chemical treatment such as waterproofing or mildew-proofing.
13. Delustering or lustering.
14. Degumming.
15. Kier boiling.
16. Scouring.
17. Stripping.
18. Felting.
19. Oiling or lubricating.
20. Weighting or loading.

B. Dyeing processes:

1. Dyeing in neutral, acid or alkaline baths.
2. Reserving cotton in acid baths.
3. Dyeing with developed dyes.
4. Dyeing of animal fibers with vat dyes.
5. Dyeing cellulose acetate fibers with insoluble dyes.
6. Dyeing and printing with aniline black.
7. Dyeing of leather.
8. In printing pastes to assist in the dispersion of the dye or dye component and in the penetration into the natural or synthetic fiber.

C. Dyes and coloring material:

1. For making pastes of dyes or dye components.
2. For the production of pigments of azo, basic, acid vat, and sulphur dyes in a finely divided condition.
3. For the production of finely divided inorganic pigments.

D. Miscellaneous uses:

1. For converting liquid or solid substances normally insoluble in water, such as hydrocarbons, higher alcohols, other oxygen containing compounds, fats, oils, waxes, resins, pitches and pitchy substances into clear solutions or stable emulsions or dispersions.
2. As cleansing agents particularly in hard water and where a fatty or oily film resists the ordinary cleansing media.
3. In tanning.
4. In softening and treating baths for hides and skins, particularly the fat liquid treatment.
5. In flotation processes including minerals and oils such as the recovery of fixed oil from the oil sands.
6. In tooth pastes, tooth powders and dentrifices generally.
7. In the treatment of paper pulp and cellulosic materials generally.
8. In latex solutions and adhesives containing latex and related substances.
9. As a mold lubricant for use in the manufacture of rubber and other molded or moldable products.
10. For the breaking of petroleum emulsions which occur in nature or are formed during the refining of petroleum.

E. General:

1. The reagents may be used in pure or standardized form.
2. May be used in conjunction with the known processing or treating agents.

Of course, no single compound shows all these properties to a marked degree. A good wetting agent is not necessarily the best detergent or best softening agent but it is an advantage of this group of compounds that by a selection of the proper chain length and configuration for the side chain, an agent possessing a particular surface active property to a marked degree can be obtained.

As many apparently widely different embodiments of this invention may be made without departing from the spirit and scope thereof, it is to be understood that I do not limit myself to the specific embodiments thereof except as defined in the appended claims.

I claim:

1. A process of preparing surface active substances which comprises reacting an alkoxy cyclohexanol with a sulphating agent at a low temperature until sulphation is at least partially complete.

2. The process of preparing surface active substances which comprises reacting an alkoxy cyclohexanol with a sulphating agent, in the presence of an inert solvent.

3. The process of preparing surface active substances which comprises reacting an alkoxy cyclohexanol with chlorsulphonic acid, at a low temperature, until sulphation is at least partially complete.

4. The process of preparing surface active substances which comprises reacting an alkoxy cyclohexanol with a sulphating agent at a low temperature until sulphation is at least partially complete, neutralizing the reaction mixture with an alkali and separating the salt of the sulphated product from the reaction mixture.

5. Sulphated alkoxy cyclohexanols.

6. The sulphuric acid ester of an alkoxy cyclohexanol.

7. Lauroxy cyclohexyl sodium sulphate.

8. Decoxy cyclohexyl sodium sulphate.

9. The sulphate of the mono ether of cyclo hexandiol and the higher boiling by-product alcohols from the catalytic methanol synthesis with hydrogen and carbon dioxide.

10. New compounds useful as textile assistants included in the group consisting of sulphuric acid esters of alkoxy cyclohexanol and water-soluble organic and inorganic salts thereof.

HERBERT A. LUBS.